United States Patent Office 3,642,733
Patented Feb. 15, 1972

3,642,733
BEAD POLYMERIZATION PROCESS AND PRODUCT
Carl S. Anderson, Bethlehem, Pa., and David F. Bittle, Thomas M. Veazey, and Robert G. Wooten, Decatur, Ala., assignors to Monsanto Company, St. Louis, Mo.
No Drawing. Continuation-in-part of abandoned application Ser. No. 398,047, Sept. 21, 1964. This application Oct. 23, 1968, Ser. No. 770,110
Int. Cl. C08f 3/76, 15/40
U.S. Cl. 260—80.81
7 Claims

ABSTRACT OF THE DISCLOSURE

Bead polymers containing acrylonitrile and having considerably enhanced receptivity for basic dyestuffs are produced by a redox catalyzed suspension polymerization process wherein small quantities of long chain fatty acids or fatty acid salts are used.

CROSS REFERENCE TO RELATED APPLICATION

This is a continuation-in-part of application Ser. No. 398,047, filed Sept. 21, 1964, now abandoned.

BACKGROUND OF THE INVENTION (1) Field of the invention

This invention relates to process of producing bead polymers in a suspension polymerization system through the use of a redox catalyst and fatty acids or fatty acid salts.

(2) Description of the prior art

It is well known in the art that long chain molecules may be formed by the polymerization process alternatively referred to as "bead," "pearl," or "suspension" polymerization. In suspension polymerization, a monomer or a plurality thereof is dispersed in a second liquid phase by strong mechanical agitation. The monomer is suspended in droplet form, the droplets being larger than those of a true emulsion, whereupon the same are polymerized by the action of a monomer-soluble free radical catalyst. The monomer and the polymer are both insoluble in the second liquid phase. The second liquid phase is generally water and may have added thereto agents which hinder the coalescence of the droplets during polymerization, and others which reduce the solubility of the monomer in the second phase. The monomer, depending upon the kind and upon polymerization conditions, forms hard or soft spheres, pearls, beads or the like upon polymerization, which separate more or less easily from the aqueous phase, again depending upon kind, when stirring is discontinued. The most successful commercial application of this process is for the polymerization of olefinic monomers.

Only monomers which are insoluble or slightly soluble in water are generally polymerized by the suspension process. Where the solublility of the monomers or the polymerized droplets is too great, electrolytes such as the alkali salts of strong acids, which have a salting-out effect, may be added. To start the polymerization of the monomers, an initiator or catalyst is added to the monomer phase. For the most part, the same monomer soluble initiators are used as in ordinary solution or bulk polymerization.

It is well known in the art that such a procedure may be applied in the pearl polymerization of acrylonitrile. However, in such a process the polymer specific viscosity is highly sensitive to reaction conditions such as reactant concentrations, feed rates, temperatures and such as in particular the reaction is difficult to control in such a manner that the polymer pearls will have both the desired chemical properties and a physical size and aggregation optimum for high speed separation and washing, such as in a centrifuge. These same problems are also apparent with "precipitation polymerization" wherein a water-soluble catalyst system is used and conditions are such that essentially the entire polymerization reaction takes place in aqueous solution; the water-insoluble polymeric product being obtained as a flocculant precipitate.

SUMMARY OF THE INVENTION

It has now been found that by the use of a water-soluble redox catalyst system in a suspension polymerization process along with the use of small quantities of a long chain fatty acid or fatty acid salt it is possible to produce bead polymers of acrylonitrile or copolymers comprising a major portion of acrylonitrile which have usually desirable properties for the production of synthetic textile fibers, the polymer furthermore being relatively insensitive to small variations in operating variables with respect to molecular weight and being easily obtainable in a particular size suitable for rapid separation and washing in a high speed centrifuge. A further unexpected and highly gratifying discovery is that textile fibers made from the polymer of this invention have a considerably enhanced receptivity for basic dyestuffs as compared with polymers of similar monomeric composition and molecular weight made by the processes of the prior art.

Therefore a primary object of this invention is to provide a new and novel process for the production of bead polymers.

Another object of this invention is to provide a process for producing bead polymers which have excellent centrifuging properties.

A further object of this invention is to provide an acrylonitrile-based bead copolymer having an enhanced receptivity for basic dyestuffs.

More specific objects and advantages will be apparent to those skilled in the art from the following more detailed description, which illustrates and discloses but is not intended to limit the scope of the invention.

DESCRIPTION OF THE PREFERRED EMBODIMENTS

In accordance with this invention, a water precharge is added to a reactor, whereupon a quantity of salt, preferably ammonium or alkali metal sulfate, is added which will reduce the solubility of the monomers in the aqueous phase. Approximately simultaneously, a small amount of a long chain fatty acid or, more conveniently, a soluble fatty acid salt is charged, which for reason as yet unexplained stabilizes both the polymer length and the monomer content in the desired ranges. The total monomer feed and about 80 percent of the activator feed, typically a sulfur dioxide solution, are added. After the above steps have been carried out, the contents are heated to a desired degree and an initiator, typically an iron salt solution, is added thereto. Thereafter, the catalyst, typically an alkali metal persulfate, and the remaining 20 percent of the activator solutions are fed simultaneously into the slurry over a period of time. Upon polymerization, the polymer product is isolated from the slurry and dried. In a preferred example, the slurry is pumped to a centrifuge where the polymer is dewatered, washed and discharged to a wet cake hopper for ultimate feed to a polymer dryer.

As has been pointed out, one main purpose for polymerizing monomers by this particular system is to provide a polymer which may be easily centrifuged. In the present invention, terpolymers from mixtures of acrylonitrile, vinyl acetate and styrene monomers polymerize in beads which form roughly spherical agglomerates of about 0.02—

0.04 inch diameter which may be readily washed and dewatered in a centrifuge. The polymers with the most desired properties consisted of approximately 90 percent acrylonitrile, from 7.0 percent to 8.5 percent vinyl acetate and from 1.5 percent to 3.0 percent styrene and had a specific viscosity in the range of 0.15–0.20.

The specific viscosity of the polymer, which is a measure of the average molecular weight, may range from 0.10 to 0.40, but the preferable range for spinning textile fibers is from 0.15 to 0.20. These values are determined at 25° C. using a size 50-Canno-Fenske viscometer and are calculated from the following formula:

Specific viscosity ($N_{sp}$)

$$= \frac{\text{Viscosity of a solution of 0.1 gram of polymer in 100 ml. of N,N-dimethylformamide}}{\text{Viscosity of N,N-dimethylformamide}} - 1$$

Polymer solutions suitable for being spun into fibers are obtained by dissolving the polymer in any suitable organic solvent. The viscosity of the resulting spinning solution depends upon the polymer to solvent ratio and upon the polymer $N_{sp}$. It is desirable, therefore, to control the polymer $N_{sp}$ at a constant level so that the polymer to solvent ratio and spinning solution viscosity may also be constant.

The redox catalyst systems which may be used comprise those generally recognized as being effective in vinyl polymerizations of the precipitation type. Such systems employ a water-soluble oxidizing agent comprising perborates, perchlorates, persulfates, persulfuric acid and perdisulfates and as an activator an oxidizable sulfoxy compound such as sulfur dioxide, sodium bisulfite, hydrosulfite and thiosulfate or oxidizable organic sulfur compounds such as dialkyl sulfites, p-toluene sulfinic acid and formamidine sulfinic acid.

The optimum pH of the system is approximately 2 and for this reason sulfur dioxide is the preferred activator. With sulfur dioxide, the desired pH is obtained without further adjustment whereas with other activators it may be necessary to add a mineral acid to obtain the desired pH. As is known from their use in precipitation polymerization, the catalytic activity of redox systems is pH dependent. At a pH above 4.0 activity decreases rapidly and polymerization almost ceases at a pH of about 4.5. In the present system, an additional reason for maintaining a low pH is to insure that when a fatty acid salt is employed as the source of fatty acid the salt will be hydrolyzed to the free acid from and thus prevented from acting as an emulsifying agent. Emulsification would negate a major purpose of the invention; that of obtaining the polymer in bead form. It is therefore necessary that the pH of the system be maintained below about 4.0 and preferably below about 3.5.

The salts which may be used for reducing the solubility of the monomers in the aqueous phase are those already well known in the art of suspension polymerization but are preferably those of an alkali metal and a strong mineral acid, sodium sulfate being a preferred choice because of its economic availability. Ammonium salts are slightly detrimental to polymer color but otherwise satisfactory.

The soluble fatty acid salts are the alkali metal salts of saturated fatty acids having from 8 to about 18 carbon atoms, one example of such being sodium stearate, which may be purchased from Proctor and Gamble Company, Cincinnati 1, Ohio, under the trade name of "P & G Soap Flakes." It should be pointed out that the soap does not serve as an emulsifying or suspending agent and in fact does not exist as soap at the low pH of the system. The soap serves as a convenient source of fatty acid, which is the active ingredient in controlling the ratio of the monomers in the copolymer as well as the specific viscosity of the polymer.

In otherwise similar polymerizations but without the fatty acid salt or fatty acid additive the ratio of monomers in the polymer product varied over wide limits and the polymer specific viscosity could not be held within the desired range. The following examples illustrate the variability of specific viscosity and monomeric composition obtained in the absence of a fatty acid additive, and the excellent control and reproducibility achieved by the addition of a small quantity of a fatty acid salt. In all examples, the target $N_{sp}$ was 0.170 and all variables such as quantities of catalyst and activator, water to monomer ratio, etc., were held constant except for the presence or absence of the fatty acid salt and variations in the quantities of added vinyl acetate and sodium sulfate.

The following examples are cited to illustrate the invention and they are not intended to limit this invention in any way. Unless otherwise noted, "parts" as expressed in the examples indicate parts by weight.

EXAMPLE I

About 8000 lbs. or 80 percent of the total water supplied to the reactor was added as precharge, with the remaining 2000 lbs. being divided equally between the catalyst and activator feed solutions. After the total amount of sodium sulfate which was 2.5 percent based on the weight of the monomer was dissolved in the water precharge, the total charge of 2000 lbs. of monomers consisting of 87.3 percent acrylonitrile, 10.6 percent vinyl acetate, and 2.1 percent styrene were added thereto, together with 80 percent by weight of the $SO_2$ activator solution. The reactor contents were then heated to approximately 61° C. whereupon $0.85 \pm 0.05$ part per million based on monomer of $Fe^{++}$ as ferrous sulfate heptahydrate ($FeSO_4 \cdot 7H_2O$) was added as the initiator. Immediately upon adding the initiator, the catalyst solution and the remaining 20 percent of the activator solutions were simultaneously fed thereto over a period of 60 minutes. Specifically, the total water to monomer ratio in each example was 5 to 1, the $K_2S_2O_8$ catalyst to monomer ratio was 0.75 to 100 and, the $SO_2$ activator to monomer ratio was 4.63 to 100.

After about 6 to 8 minutes in the catalyst addition period, cooling water was circulated in the jacket of the reactor to control the temperature rise since the polymerization reaction is vigorously exothermic. The reactor temperature peaked at approximately 70° C. to 75° C. in about 45 minutes from the initiation of the catalyst addition period.

Slurry viscosity or thickness increases to a peak after approximately 25 to 30 minutes in the catalyst addition period. Five to ten minutes after the peak slurry viscosity, the slurry becomes markedly thinner and continues to become less viscous throughout the remainder of the catalyst addition period; however, the viscosity does not decrease to its original level and at the end of reaction period, it is at a higher value than at the beginning of the period. Slurry viscosity can be readily measured by any applicable means, such as by monitoring the power or current load required for the agitator. Typical amperage values which illustrate the changing load requirement obtained from the following examples were 5.2 starting amperage, 6.5 peak value, and 5.7 final value.

When the catalyst and activator feeds were exhausted, the slurry was agitated for an additional 20 to 30 minutes during which time the temperature decreased to about 60° C., whereupon steam was applied to the reactor jacket to distill any residual unreacted monomers from the slurry. If the repossession of the residual monomers is not desired, the slurry may be cooled immediately to the desired centrifuging temperature of 40° C. to 50° C., and pumped to the centrifuge. If desired, unreacted monomers may also be recovered by distillation of filtrate and wash waters after centrifuging.

In this example, no fatty acid or fatty acid salt was added and Table I (below) shows the erratic behavior of the polymer $N_{sp}$ and percent vinyl acetate due to the absence thereof.

TABLE I

| Run No. | Soap | Na₂SO₄¹ | Percent VA in monomer | Percent VA in polymer | Percent VA conversion | Polymer $N_{sp}$ |
|---|---|---|---|---|---|---|
| A | 0 | 2.5 | 10.6 | 5.8 | 55 | 0.207 |
| B | 0 | 2.5 | 10.6 | 6.3 | 60 | .174 |
| C | 0 | 21 | 10.6 | 6.4 | 60 | .159 |
| D | 0 | 21 | 10.0 | 7.5 | 82 | .194 |

¹ Weight percent based on monomer.

All of the polymers were prepared as heretofore described, and under the same conditions except for the difference noted in Table I. Runs A and B were duplicate polymerizations employing no fatty acid and 2.5 parts of sodium sulfate. As shown in Table I, the vinyl acetate conversion varied from 55 to 60 percent, and the $N_{sp}$ varied from 0.174 to 0.207. Runs C and D were also essentially duplicate polymerizations except for a slight variation in the vinyl acetate concentration in the monomer feed, and employed 21 parts of sodium sulfate. The higher level of sodium sulfate had no evident effect upon polymer reproducibility, and the vinyl acetate conversion varied from 60 to 82 percent, while $N_{sp}$ varied from 0.159 to 0.194. The percent styrene in the polymer in all cases was 2.1±0.1.

The centrifuging properties of Runs C and D above were so extremely poor that a solid cake was not obtained and the polymer batch was dumped. The polymer from Runs A and B was recovered from the slurry by centrifuging with some difficulty.

EXAMPLE II

The process of Example I was repeated with sodium stearate (soap) being incorporated into the reaction mixture as hereinafter set forth. The soap was dissolved in the water precharge along with the sodium sulfate in the amount of 0.5 percent based on the weight of the monomer. Vastly improved results were obtained thereby as shown by the data as presented in Table II below.

TABLE II

| Run No. | Soap¹ | Na₂SO₄¹ | Percent VA in monomer | Percent VA in polymer | Percent VA conversion | Polymer $N_{sp}$ |
|---|---|---|---|---|---|---|
| E | 0.5 | 5.0 | 12.9 | 7.7 | 60 | 0.171 |
| F | 0.5 | 5.0 | 13.3 | 8.3 | 62 | 0.172 |
| G | 0.6 | 5.0 | 12.3 | 7.3 | 59 | 0.169 |
| H | 0.6 | 5.0 | 12.3 | 7.5 | 61 | 0.171 |

¹ Weight percent based on monomer.

It is clearly evident from the above data that the addition of small amounts of soap to the polymerization reaction stabilizes the reaction and produces a uniform and consistent product from batch to batch. It is also apparent from this data that small variations in feed stock have no appreciable effect on the reaction, as shown by the change in soap addition from 0.5 to 0.6 part, and by the change in vinyl acetate level from 12.3 to 13.3 percent of the monomer feed, neither of which changes had any appreciable effect on either vinyl acetate conversion or polymer $N_{sp}$. The styrene content of the polymer was 2.1±0.1 percent in all of the above examples.

In addition to the fine degree of reproducibility resulting from the addition of soap to the polymerization reactor, the polymer product from each of the examples in Table II was easily removed from the slurry by centrifuging. The polymer was characterized by a relatively small percentage of fines as shown by a wet screen analysis, wherein at least 75 percent of the polymer was retained on a N. 60 U.S. Sieve while only 7 to 11 percent passed through a No. 100 U.S. Sieve.

The following is a comparison between the basic dye uptake (BDU) of fibers spun from the polymers of the present invention and that of fibers spun from polymers prepared according to the polymerization processes of the prior art but having the same molecular composition and weight. The fibers were prepared by conventional wet spinning techniques wherein the polymer was dissolved in a suitable organic solvent, extruded through a shaped orifice into an aqueous coagulation bath, washed, stretched, and dried.

The basic dye uptake of the fiber was determined by preparing 25 gm. of a 0.3 percent solution of Sevron Blue 2 G Basic Blue 22, immersing a 0.5 gm. fiber sample in the bath for two hours at 100° C., and determining the amount of dye remaining in the bath by measuring the optical density. The basic dye uptake is then calculated as follows:

$$BDU = \frac{\text{weight dye absorbed}}{\text{weight of fabric}} \times 100$$

The improved basic dye uptake of the fiber spun from the polymer of the present invention as compared to those spun from polymers produced by the prior art is illustrated by the results given in Table III below:

TABLE III

| Polymerization process | $N_{sp}$ | Percent VA | Percent styrene | Strong acid end groups | Weak acid end groups | Fiber BDU |
|---|---|---|---|---|---|---|
| 1. Continuous precipitation | .169 | 7.3 | 0 | ¹ 39.7 | ¹ 20.0 | 6.9 |
| 2. Continuous precipitation | .171 | 7.0 | 1.8 | 27.0 | 28.3 | 6.4 |
| 3. Batch suspension | .174 | 7.4 | 2.2 | 15.0 | 31.6 | 4.3 |
| 4. This invention | .170 | 7.5 | 2.2 | 36.4 | 41.6 | 7.9 |

¹ Microequivalents per gram.

While it is known to produce copolymers of acrylonitrile with specific acidic comonomers to enhance the receptivity of the copolymer for basic dyestuffs, comonomers are generally conceded to be detrimental to all other physical properties of the acrylonitrile polymer excepting dyeability. The importance of achieving maximum dyeability with a minimum incorporation of comonomers into the acrylonitrile polymer chain is thus clearly evident. Table III above illustrates that polymers of a given monomeric composition and molecular weight have a greater dye receptivity when prepared according to the instant invention than when prepared by conventional methods.

All variables between the several items of Table III not inherently different because of the differing nature of the processes were maintained as near identical as practical in order to eliminate as completely as possible differences not directly related to the process of manufacture. In all instances an aqueous medium was used, the water to monomer ratio being 5:1. All were redox catalyzed with the catalyst (potassium persulfate) ratio being 0.75±0.05 to 100 parts monomer and the activator (sulfur dioxide) ratio being 4.63±0.31 to 100 parts monomer. The monomer feeds were 12.0±1.0% vinyl acetate and 2.0±0.2% styrene in all items except No. 1 wherein the styrene was omitted, the remainder in all instances being acrylonitrile. The pH of items 1 and 2 were maintained at 3.0±0.1. The initial pH of items 3 and 4 was approximately 3.0 with the ultimate pH after all activator addition in each instance approaching a value of 2. Common techniques were employed in items 1, 2, and 3 while item 4 was a separate run duplicating Example 2, Table II, item H.

The basic dye uptake of the fiber is related to the concentration of available acid end groups within the polymer chain, and for this reason the acid end group analysis data is presented with the fiber BDU data in Table III.

The strong acid groups consist of —$OSO_3H$ and —$SO_3H$ end groups which are produced, predominately in the salt form, from the persulfate and sulfur dioxide of the redox catalyst-activator polymerization initiator system. The weak acid consists of carboxylic acid groups, and although its derivation is not known positively at this time, it is theorized that these groups could be produced by hydrolysis of the monomer nitrile groups at the low pH (about 2) maintained during the polymerization.

To determine the acid end group concentration of the polymer, a weighed sample of polymer was dissolved in an 80 percent ethylene carbonate 20 percent propylene carbonate solvent mixture. The polymer solution was passed through an ion exchange resin bed containing Amberlite MB–3 to remove all ionizable impurities and to convert all sulfate and sulfonate groups to free acid. The sample was then titrated potentiometrically under a nitrogen atmosphere, with 0.02 N tetramethylammonium hydroxide, and the end points determined by plotting ml. of titrant vs millivolts and establishing the midpoint of each potentiometric inflection.

Acid end groups were calculated in microequivalents per gram as follows:

$$\text{Strong: } \frac{(A-C) \times N}{\text{Sample wt.}} = \mu\text{eq./gm. } (-SO_3H \text{ plus } -OSO_3H)$$

$$\text{Weak } \frac{(B-A) \times N}{\text{Sample wt.}} = \mu\text{eq./gm. } (-COOH)$$

where A is the titration in ml. to the mid point inflection of the strong acid; B is ml. to the mid point inflection of the weak acid, and C is the "blank" titration in ml.

Polymerization process No. 1 and No. 2 in Table III demonstrate the normal expectation that the addition of styrene to the monomer mixture reduced the dye receptivity of the resultant polymer. Polymerization process 3 illustrates a further reduction in BDU due to the method of manufacture and also to a lesser degree to the slightly increased styrene content. Polymerization process 4 demonstrates the unexpected advantage in BDU gained by the process of this invention.

Many modifications of the invention may be made without departing from the scope and spirit thereof. It is contemplated that variations may be made in the percentages of the compounds used without greatly altering the effectiveness of the process; therefore, the applicants do not wish to be bound by the numbers except as they appear in the claims.

What is claimed is:

1. A process for the production of copolymers comprised of at least 80% acrylonitrile and up to 20% of at least one other vinyl monomer copolymerizable therewith comprising polymerizing said monomers while suspended in an aqueous medium at a pH of less than about 4.5 and in the presence of a water soluble redox catalyst system, an alkali metal sulfate, and at least one member selected from the group consisting of aliphatic monocarboxylic acids of eight to eighteen carbon atoms chain length and salts of these acids.

2. A process for the production of granular copolymers comprised of at least 80% acrylonitrile and up to 20% of at least one other vinyl monomer copolymerizable therewith comprising suspending said monomers in an aqueous medium at a pH of less than about 4.5 and polymerizing said monomers in the presence of potassium persulfate, sulfur dioxide, ferrous sulfate, sodium sulfate, and at least one member selected from the group consisting of aliphatic monocarboxylic acids of eight to eighteen carbon atoms chain length and salts of these acids.

3. The process of claim 2 wherein the monomers are comprised of acrylonitrile, vinyl acetate, and styrene.

4. A process for the production of copolymers of acrylonitrile and at least one other vinyl monomer copolymerizable therewith comprising the steps of:
   (a) precharging a receptacle with water;
   (b) adding thereto an alkali metal sulfate and at least one member selected from the group consisting of aliphatic monocarboxylic acids of eight to eighteen carbon atoms chain length and salts of these acids;
   (c) charging said water with a polymerization activator comprising an oxidizable sulfoxy compound and adjusting the pH of said water to a value below about 4.5;
   (d) forming a suspension of the monomers of acrylonitrile and at least one other monomer copolymerizable therewith in said water;
   (e) triggering the polymerization process by adding an initiator to said suspension; and
   (f) simultaneously and continuously adding to said suspension over a period of time an aqueous catalyst solution and an additional portion of aqueous activator solution.

5. A process for the production of granular copolymers of acrylonitrile and at least one other vinyl monomer copolymerizable therewith, said copolymers being comprised of at least 80% acrylonitrile and up to 20% of said at least one other vinyl monomer, comprising the steps of:
   (a) precharging a receptacle with water;
   (b) adding thereto sodium sulfate in sufficient quantity to reduce the solubility of the monomers in said water, a polymerization regulating quantity of an aqueous solution of a salt of an aliphatic monocarboxylic acid of eight to eighteen carbon atoms chain length, and an aqueous solution of sulfur dioxide in at least sufficient quantity to reduce the pH of the resulting aqueous mixture to a pH below about 3.5;
   (c) suspending the total quantity of monomers to be polymerized in said aqueous mixture; and
   (d) initiating the polymerization process by adding to said aqueous mixture a triggering quantity of a water-soluble ferrous salt, then continuously adding to said aqueous mixture an aqueous potassium persulfate catalyst solution and an aqueous sulfur dioxide activator solution over a period of time.

6. The process of claim 5 wherein the monomers are comprised of at least 80 percent acrylonitrile, at least 3 percent vinyl acetate and at least 1 percent styrene.

7. A process for the production of granular copolymers of acrylonitrile, vinyl acetate and styrene, said copolymers being comprised of at least 80% acrylonitrile and up to 20% of vinyl acetate and styrene, comprising the steps of:
   (a) charging a receptacle with 800 parts of water;
   (b) dissolving approximately 2.5 percent based on the weight of the monomer of sodium sulfate in said water;
   (c) dissolving approximately 0.5 percent based on the weight of the monomer of a salt of a monocarboxylic acid of eight to eighteen carbon atoms chain length in said water;
   (d) adding to said water an aqueous solution consisting of approximately 7.4 parts of sulfur dioxide in 80 parts of water;
   (e) adding to said water 200 parts of monomers comprised of at least 80 percent acrylonitrile, at least 3 percent vinyl acetate, and at least 1 percent styrene,
   (f) forming a suspension of said monomers in droplet form in said water by agitation while adding said monomers to said water;
   (g) heating said suspension to approximately 60° C., adding approximately 0.90 part per million based on monomer of ferrous ion in the form of a water-soluble ferrous salt to said suspension to initiate the polymerization of said monomers;
   (h) continuously adding to said suspension a catalyst solution consisting of approximately 1.5 parts of potassium persulfate in 100 parts of water;
   (i) continuously adding to said suspension an activator solution consisting of approximately 1.85 parts of sulfur dioxide in 20 parts of water simultaneously with the addition of said catalyst solution, and (j) maintaining said suspension at a maximum temperature of 75° C. during the polymerization of said monomers.

References Cited

UNITED STATES PATENTS

| | | | |
|---|---|---|---|
| 2,757,165 | 7/1956 | Slocombe | 260—80.81 |
| 2,917,474 | 12/1959 | Fisher. | |
| 2,974,123 | 3/1961 | Ketterer | 260—63 |
| 3,123,588 | 3/1964 | Lunney | 260—79.3 |
| 3,255,158 | 6/1966 | Anthes | 260—79.3 |
| 3,260,707 | 7/1966 | Caldwell | 260—79.3 |
| 3,310,535 | 3/1967 | Mazzolini | 260—78.5 |
| 3,344,127 | 9/1967 | Masson | 260—80.73 |
| 3,366,711 | 1/1968 | Mazzolini | 260—898 |
| 3,388,189 | 6/1968 | Mazzolini | 260—895 |

OTHER REFERENCES

Chem. of Acrylonitrile, American Cyanamid Co., New York (1959), pp. 32, 36.

JOSEPH L. SCHOFER, Primary Examiner

C. A. HENDERSON, Jr., Assistant Examiner

U.S. Cl. X.R.

8—168; 260—79.3 M, 85.5 ZA, 85.5 L, 88.7 R, 88.7 E